United States Patent
Matsuzaki

[11] Patent Number: 5,337,245
[45] Date of Patent: Aug. 9, 1994

[54] LOCATION DETECTING APPARATUS WITH OVERSPEED PREDICTING MEANS

[75] Inventor: Shin-ichi Matsuzaki, Osaka, Japan

[73] Assignee: Sumitomo Electric Industries, Ltd., Osaka, Japan

[21] Appl. No.: 970,075

[22] Filed: Nov. 3, 1992

[30] Foreign Application Priority Data

Nov. 18, 1991 [JP] Japan .................................. 3-302176

[51] Int. Cl.$^5$ .............................................. G06F 15/50
[52] U.S. Cl. ..................................... 364/449; 364/453; 340/988; 340/995
[58] Field of Search ............... 364/443, 444, 449, 450, 364/453; 73/178 R; 340/988, 990, 995; 342/451, 457

[56] References Cited

U.S. PATENT DOCUMENTS

| | | | |
|---|---|---|---|
| 4,882,689 | 11/1989 | Aoki | 340/995 |
| 5,043,902 | 8/1991 | Yokoyama et al. | 340/988 |
| 5,058,023 | 10/1991 | Kozikaro | 364/449 |
| 5,266,948 | 11/1993 | Matsumoto | 340/990 |

FOREIGN PATENT DOCUMENTS 1194965 10/1985 Canada .
4201142 8/1992 Fed. Rep. of Germany .

Primary Examiner—Gary Chin
Attorney, Agent, or Firm—Lane, Aitken & McCann

[57] ABSTRACT

A location detecting apparatus comprising a road map memory having road map data stored therein, a heading sensor for sensing a heading of a vehicle, a velocity sensor for sensing a velocity of the vehicle to obtain distances traveled by the vehicle, a location detecting unit for calculating an estimated location of the vehicle on the basis of the integrated distances and heading and for detecting a current location of the vehicle on a road on the basis of a degree of similarity between the estimated location and the road map data, a road searching unit for searching a road that is ahead of the current location detected by the location detecting unit, a predicting unit for calculating a predicted transverse acceleration to which the vehicle is exposed, on the basis of a radius of curvature of the searched road and the velocity sensed by the velocity sensor, and a warning unit for comparing the transverse acceleration with a predetermined threshold value and for giving warning to a vehicle operator if the transverse acceleration is greater than the predetermined threshold value.

1 Claim, 5 Drawing Sheets

LOCATION DETECTING APPARATUS WITH OVERSPEED PREDICTING MEANS

FIELD OF THE INVENTION

The present invention relates to a location detecting apparatus with overspeed predicting means, and more particularly to such an apparatus which detects the location of a vehicle traveling streets by a map matching method, detects a degree of winding of a road that is ahead of the vehicle, and determines if a current speed of the vehicle is suitable to the detected degree of winding of the road ahead of the vehicle.

DESCRIPTION OF THE PRIOR ART

As a method for providing information about the actual location of a vehicle traveling streets, there is known "dead reckoning," in which a distance sensor, a heading sensor, and a processing unit for processing distance and heading data obtained from the distance and heading sensors are employed and the current location data of a vehicle are obtained by using an amount of distance change $\delta L$ and a heading $\theta$. In dead reckoning, the east-west directional component $\delta x$ ($=\delta L \times \cos \theta$) and south-north directional component $\delta y$ ($=\delta L \times \sin \theta$) of the distance change amount $\delta L$ that occurs as the vehicle moves along streets are calculated, and current location output data (Px, Py) are obtained by adding the calculated components $\delta x$ and $\delta y$ to the previous location output data (Px', Py'). However, errors inevitably inherent in the distance and heading sensors are accumulated as the vehicle travels, so that errors contained in the current location data are to be accumulated.

Map matching methods have been proposed and developed in order to overcome the problem described above. In the map matching methods, location data of a vehicle obtained by dead reckoning are compared every constant distance or constant time with road map data stored in advance in a memory unit. A range of error (i.e., a limit error (including a distance error, a heading error and a map error) that the previous location data (Px', Py') have) is obtained by dead reckoning. Then, by adding an increase in the limited error caused by the distance $\delta L$ traveled by the vehicle to the range of error, an estimated location of the vehicle is registered so that it corresponds to each road located within current location data (a range of error that (Px, Py) has). The estimated location thus registered is updated as the vehicle travels. A coefficient of correlation (coefficient of vehicle existence with respect to the road of the estimated location) is calculated every predetermined time or predetermined distance. Accumulated errors with respect to the location data is corrected with a correlation coefficient which is smallest among correlation coefficients less than a predetermined threshold value, and then a current location of the vehicle is matched to a location on road (Japanese patent laid-open publication Nos. 63-148115, 63-115004, and 64-53112). The vehicle location determined in this way is outputted as a current location and displayed together with road map.

Where, on the other hand, a road winds largely, a vehicle operator has to decrease the speed of the vehicle. Otherwise, the vehicle is subjected to transverse acceleration and in danger of being forced out of the winding road.

If a vehicle operator can be constantly informed of the degree of winding of a road ahead of the vehicle and control the speed of the vehicle in accordance with the degree of winding, the vehicle can be driven in safe. However, since the map matching method has been developed for the purpose of accurately detecting the actual location of a vehicle, the degree of winding of the road ahead of the detected location of the vehicle cannot be determined through the road map displayed by the map matching method.

Accordingly, it is an important object of the invention to provide a location detecting apparatus with overspeed predicting means which is capable of automatically identifies the configuration of a road ahead of the current location of a vehicle detected by a road matching method and predicting a degree of winding of that road on the basis of the result of identification and assisting a vehicle operator in driving safely even when a road ahead of the vehicle winds largely.

SUMMARY OF THE INVENTION

In accordance with an important aspect of the present invention, there is provided a location detecting apparatus comprises a road map memory having road map data stored therein, heading sensing means for sensing a heading of a vehicle, velocity sensing means for sensing a velocity of the vehicle to obtain distances traveled by the vehicle, and location detecting means. The location detecting means is adapted for integrating the distances and heading obtained every predetermined timing and for calculating an estimated location of the vehicle on the basis of the integrated distances and heading and for detecting a current location of the vehicle on a road on the basis of a degree of similarity between the estimated location and the road map data stored in the road map memory. The location detecting apparatus further comprises road searching means, predicting means and warning means. The road searching means searches a road that is ahead of the current location detected by the location detecting means from among road map data stored in the road map memory. The predicting means reads configuration data of the road searched by the road searching means out of the road map memory, calculates a radius of curvature of the searched road on the basis of the configuration data, and calculates a predicted transverse acceleration to which the vehicle is exposed, on the basis of the calculated radius of curvature and the velocity sensed by the velocity sensing means. The warning means compares the transverse acceleration calculated by the predicting means with a predetermined threshold value, and gives warning to a vehicle operator if the transverse acceleration is greater than the predetermined threshold value.

In FIG. 1, on the basis of the heading and speed of a vehicle and road map patterns, a current location of the vehicle is detected on a road (block (1)). On the basis of the detected current location and road map data, a road ahead of the current location of the vehicle is searched (block (3)). A radius of curvature of the read ahead of the vehicle is then calculated from the data read out of the road map memory. A transverse acceleration to which the vehicle is to be subjected is calculated from the speed of the current location being detected (block (4)). If this transverse acceleration is greater than a predetermined threshold value determined by turning ability of the vehicle (block (5)), warning is given to the vehicle operator.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
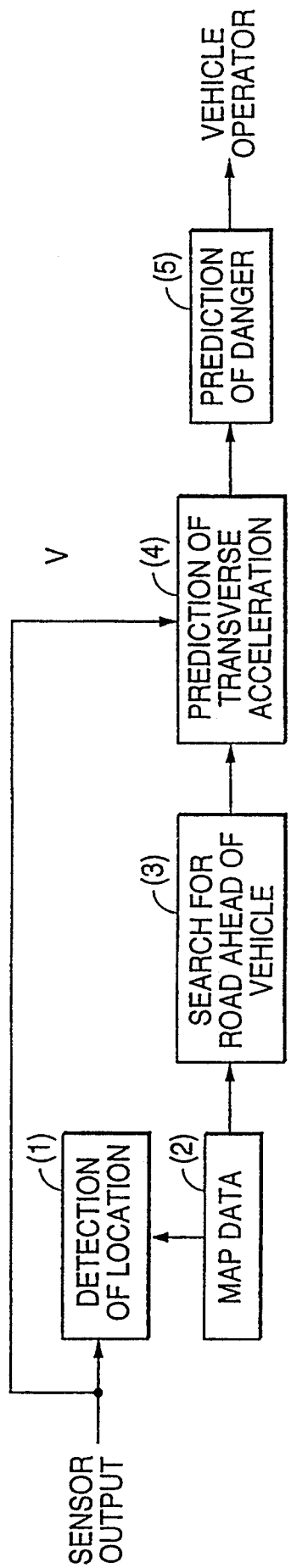
FIG. 1 is a block diagram showing how an overspeed of a vehicle is predicted in accordance with the present invention.
Figure 2:
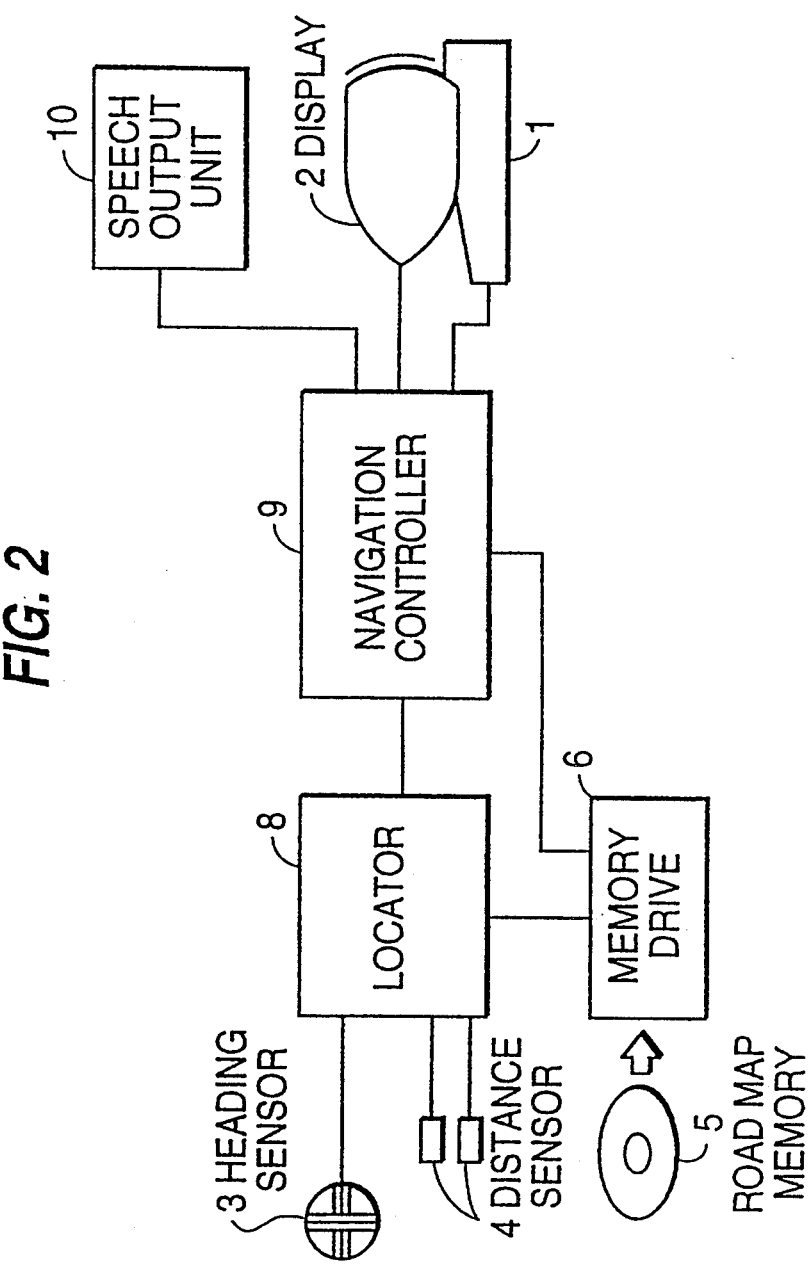
FIG. 2 is a block diagram showing a location detecting apparatus into which an overspeed predicting apparatus according to the present invention is incorporated.

Referring to FIG. 2, there is shown one example of a vehicle-location detecting apparatus. The vehicle-location detecting apparatus comprises a console 1, a display 2 mounted on the console 1, a heading sensor 3, a distance sensor 4, a road map memory 5 having road map data stored therein, a memory drive 6 for reading stored data out of the road map memory 5, a locator 8 to which the heading sensor 3, the distance sensor 4 and the memory drive 6 are connected, a navigation controller 9 to which the locator 8 and the memory drive 6 are connected, and a speech output unit 10 connected to the navigation controller 9. The navigation controller 9 reads out a road map of a predetermined area, generates display data for guiding a vehicle, and controls the display 2, the locator 8 and the speech output unit 10.

The above mentioned console 1 has a keyboard (not shown) which allows a vehicle operator to start and stop this apparatus, to move a cursor on the picture screen of the display 2, and to scroll the road map displayed on the picture screen.

The display 2 has a touch panel attached on the picture screen, the touch panel comprising a CRT (Cathode Ray Tube) or a crystalline panel. The display 2 displays the location of a vehicle detected by the locator 8 on the picture screen, together with the surrounding road map.

The heading sensor 3 is one which senses a change in the heading of a vehicle as it moves over streets. A magnetic sensor, a gyro or the like can be used as a heading sensor.

The distance sensor 4 is used to senses distances travelled by a vehicle. The distance sensor 4, for example, comprises a vehicle speed sensor which senses the speed of the vehicle, or one or more wheel sensors which sense the rotation of the wheels of the vehicle.

The road map memory 5 is constituted by a mass storage medium memory such as a CD-ROM, an IC memory card and a magnetic tape. The road map memory 5 divides a road map (containing freeways, arteries, streets, etc.) into blocks and stores combination data of nodes and links at the unit of the block. The road map memory 5 also stores therein background data such as railways, rivers and famous facilities. The node is referred to as a coordinate position for specifying an intersection or branch point of a road. In some cases, a node representing an intersection is called an intersection node and a node representing a branch point other than an intersection is called an interpolation point node. Data of a node contain a node number, addresses of nodes of surrounding blocks corresponding to that node, and addresses of links connected to that node. Links are interconnected by intersection nodes. Data of a link contain a link number, addresses of start point and end point nodes, a link distance, a link heading, road classification (freeways, arteries, streets, etc.), road width, and traffic restrictions such as one-way street and turn restriction.

The locator 8 calculates track data by integrating the distance data sensed by the distance sensor 4 and the heading change data sensed by the heading sensor 3, and detects the location of a vehicle that is on a road having a higher probability of existence of a vehicle, on the basis of comparison of the track data with road patterns stored in the road map memory 5.

The detection of location by the locator 8 will be performed as follows. Firstly, the heading data from the heading sensor 3 and the distance data from the distance sensor 4 are inputted to the locator 8, which then calculates an optimum estimated heading. From this optimum estimated heading and the distance data, an estimated location is calculated by dead reckoning. Secondly, a probability region of existence of a vehicle having the estimated location at the center thereof is obtained. The probability region is determined according to the errors of heading and distance data and is generally in the form of a circle having an estimated location at the center thereof. In addition, a degree of similarity between the track of the estimated location and the road network data in the vehicle-existence probability region that are obtained from the road map memory 5 is repeatedly calculated, and then the location of the vehicle on the link contained in the vehicle-existence probability region is calculated. Finally, the estimated location is corrected with the location of the vehicle on that link.

The above mentioned navigation controller 9 comprises a graphic processor and an image processing memory and, in addition to performing the prediction of overspeed of the present invention, controls the display 2 so that it can display a current location of a vehicle upon a signal from the controller 9.

It is noted that the vehicle-location detecting apparatus, in addition to the components described above, may further comprise a location correcting unit which receives signals from beacons or GPS (Global Positioning System) and corrects a current location of a vehicle in accordance with the received signals.

Figure 3:
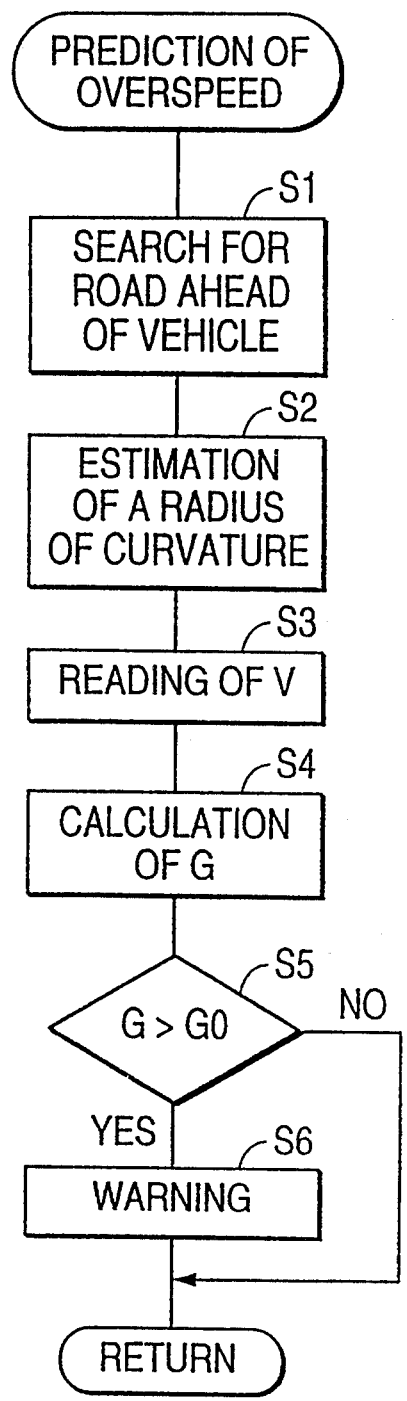
FIG. 3 is a flow chart illustrating how an overspeed of a vehicle is predicted in accordance with an embodiment of the present invention.

The overspeed of a vehicle is predicted in accordance with the steps shown in FIG. 3. In step 1, the navigation controller 9 receives information about the location and heading of the vehicle from the locator 8 every constant distance (e.g., 20 m) or constant time (e.g., 1 sec) and searches a road that is ahead of the vehicle. This search is made as follows. A plurality of links related to the location of the vehicle that are within a predetermined distance are obtained along a direction in which the vehicle advances. This predetermined distance can be determined taking into consideration the brake stopping distance of a vehicle proportional to the vehicle speed. The brake stopping distance can be varied according to various conditions such as a bad weather condition and a good weather condition. It is now supposed that the distances of the links (L1, L2, L3, . . . , and Ln) are d1, d2, d3, ..., and dn, respectively, and the headings of the links are $\theta_1, \theta_2, \theta_3, \ldots,$ and $\theta_n$, respectively.

Figure 4:
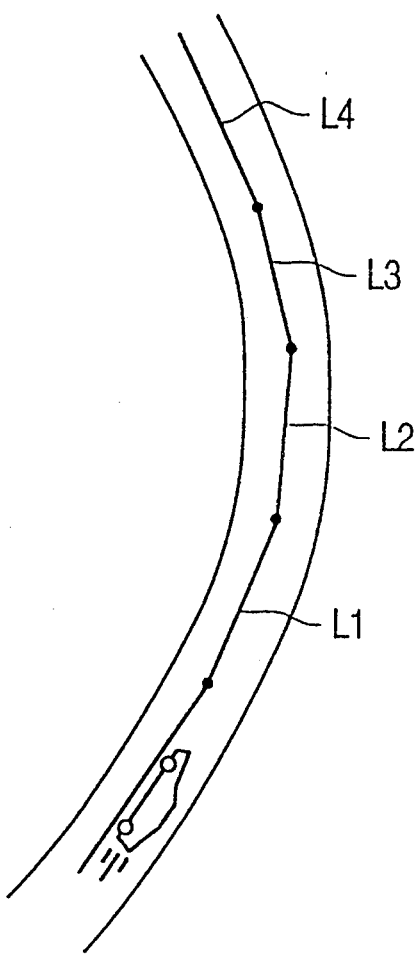
FIG. 4 illustrates pictorially the road and links ahead of a vehicle.

In step 2, a radius of curvature R is estimated. This estimation is made as follows. Three consecutive links are selected from among a plurality of links. For example, if four links L1, L2, L3 and L4 are within a predetermined distance (FIG. 4), a first set of links L1, L2 and L3 and a second set of links L2, L3 and L4 are selected. With respect to the first set of links L1, L2 and L3, a radius of curvature R1 is calculated on the basis of the distances d1, d2 and d3 and the headings $\theta_1, \theta_2$ and $\theta_3$. With respect to the second set of links L2, L3 and L4, a radius of curvature R2 is calculated on the basis of the distances d2, d3 and d4 and the headings $\theta_2, \theta_3$ and $\theta_4$. A smallest radius of curvature is selected from among a plurality of the radius of curvatures (R1, R2 ...) calculated in the way described above and is determined as a radius of curvature R of the road ahead of a vehicle.

In step 3, velocity data V are obtained on the basis of the output of the distance sensor 4. In step 4, a transverse acceleration G is calculated according to the following equation:

$$G = V^2/R$$

In step 5, the calculated transverse acceleration G is compared with a threshold value $G_O$ determined depending upon turning ability of a vehicle which is determined according to the weight, suspension structure and the tire gripping force. In step 6, it is determined that making a turn at a current speed is dangerous if $G > G_o$, and a vehicle operator is given warning. This warning, for example, is performed by a warning buzzer. If $G < G_O$, then the vehicle operator is not given warning because there is no problem even if the vehicle makes a turn at a current speed. Note that the threshold value $G_O$ can also be varied according to weather and road conditions.

Figure 5A:
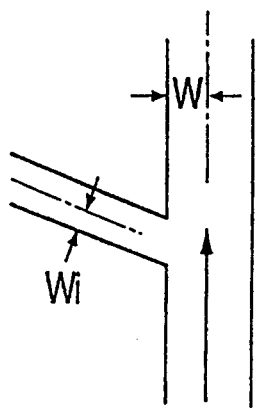
FIG. 5(a), 5(b), 5(c) and 5(d) illustrate a road with a branch point, respectively.
Figure 5B:
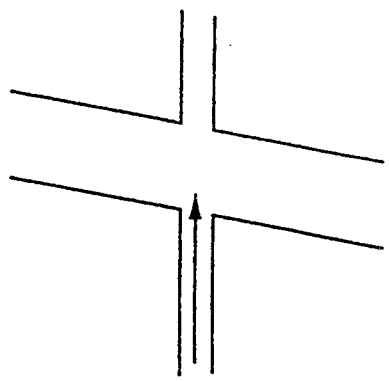

When a branch point is ahead of a vehicle, the overspeed of the vehicle is predicted as follows. If, as shown in FIG. 5(a), a branch road is within a predetermined distance along the direction in which a vehicle moves, then the width Wi (i=1, 2, ...) of one side of a traffic lane of a link corresponding to that branch road, and the heading $\theta_i$ of the link are read out. It is then determined if the width W of one side of a road that the vehicle is traveling is substantially the same as the width Wi of the branch road. For example, if $|W - W_i|/W < 0.3$, then the prediction of overspeed is made with respect to the branch road. If, on the other hand, $|W - W_i|/W > 0.3$, the prediction of overspeed is not made with respect to the branch road. This is because it is predicted that, if the road width of a branch road is narrower than the road that a vehicle operator is traveling (FIG. 5(a)), the operator decreases the speed in advance when turning to the narrower road, and because it is predicted that, if the road width of a branch road is very wider than the road that a vehicle operator is traveling (FIG. 5(b)), the operator will not be exposed to great danger when turning to the wider road at a little higher speed.

Figure 5C:
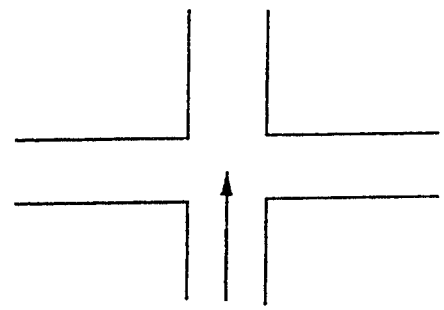
Figure 5D:
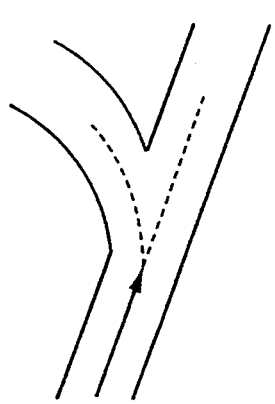

In addition, a difference between the heading $\theta_i$ of a branch road and the heading $\zeta$ of the road a vehicle operator is travelling is evaluated and, of the difference is less than a predetermined value, a prediction of overspeed is made with respect to the branch road. For example, if $|\theta - \theta_i| < 45°$, the prediction of overspeed will be made. This is because, when branch roads turn largely as shown in FIG. 5(c), it is predicted that a vehicle operator decreases the vehicle speed sufficiently in advance when turning. Therefore, the prediction of overspeed is made only when the angle of a branch road is small with respect to the road that a vehicle operator is travelling, shown in FIG. 5(d).

If, in the way described above, there exists a branch road in which the prediction of overspeed is to be made, then a vehicle is assumed to move on that branch road, and a plurality of links within the brake stopping distance of the vehicle from the current location are obtained. With respect to these links, the same processes as those of FIG. 3 are performed. Of course, the prediction of overspeed is also made with respect to the road that a vehicle operator is traveling, in accordance with the steps shown in FIG. 3. If a plurality of branch roads exist, each road is processed according to the steps of FIG. 3.

As described above, the prediction of overspeed is made with respect to branch roads and a road being traveled, and the vehicle operator is given warning if any one of the roads meets warning requirements. It should be noted that, in the case of FIG. 5(d), i.e., if there exists a branch road whose radius of curvature is small, warning is automatically given even if a vehicle operator does not turn to the branch road. However, the number of such branch roads is small, and such warning will be favorable from the standpoint of safety because a probability of traffic accident is higher at the branch point of a road.

While the subjection invention has been described with relation to the preferred embodiment, various modifications and adaptations thereof will now be apparent to those skilled in the art. All such modifications and adaptations as fall within the scope of the appended claims are intended to be covered thereby.

What is claimed is:

1. A location detecting apparatus comprising:
   a road map memory having road map data stored therein;
   heading sensing means for sensing a heading of a vehicle;
   velocity sensing means for sensing a velocity of said vehicle to obtain distance traveled by said vehicle;
   location detecting means for integrating said distances and heading obtained every predetermined timing and for calculating an estimated location of said vehicle on the basis of the integrated distances and heading and for detecting a current location of said vehicle on a road on the basis of a degree of similarity between said estimated location and said road map data stored in said road map memory;
   road searching means for searching a road that is ahead of said current location detected by said location detecting means from among road map data stored in said road map memory;
   predicting means for reading configuration data of said road searched by said road searching means out of said road map memory, for calculating a radius of curvature of said searched road on the basis of said configuration data, and for calculating a predicted transverse acceleration to which said vehicle is exposed, on the basis of the calculated radius of curvature and said velocity sensed by said velocity sensing means; and
   means for comparing said transverse acceleration calculated by said predicting means with a predetermined threshold value and for giving warning to a vehicle operator if said transverse acceleration is greater than said predetermined threshold value.

* * * * *